(12) United States Patent
Zhang et al.

(10) Patent No.: US 10,723,567 B2
(45) Date of Patent: Jul. 28, 2020

(54) ROLLING ELEMENT AND TRANSPORT APPARATUS

(71) Applicants: BEIJING BOE DISPLAY TECHNOLOGY CO., LTD., Beijing (CN); BOE TECHNOLOGY GROUP CO., LTD., Beijing (CN)

(72) Inventors: Wanpeng Zhang, Beijing (CN); Peng Cheng, Beijing (CN); Menglei Zhang, Beijing (CN); Jiangbing Guan, Beijing (CN); Min Zhang, Beijing (CN); Zhenyu Zhang, Beijing (CN); Zhuoyue Bian, Beijing (CN); Yajun Han, Beijing (CN); Junyi Dai, Beijing (CN)

(73) Assignees: BEIJING BOE DISPLAY TECHNOLOGY CO., LTD., Beijing (CN); BOE TECHNOLOGY GROUP CO., LTD., Beijing (CN)

(*) Notice: Subject to any disclaimer, the term of this patent is extended or adjusted under 35 U.S.C. 154(b) by 0 days.

(21) Appl. No.: 16/343,372

(22) PCT Filed: Mar. 12, 2018

(86) PCT No.: PCT/CN2018/007866
§ 371 (c)(1),
(2) Date: Apr. 18, 2019

(87) PCT Pub. No.: WO2018/177118
PCT Pub. Date: Oct. 4, 2018

(65) Prior Publication Data
US 2019/0241377 A1    Aug. 8, 2019
US 2020/0140212 A2    May 7, 2020

(30) Foreign Application Priority Data
Mar. 27, 2017 (CN) .................... 2017 2 0309995 U

(51) Int. Cl.
*B65G 49/06* (2006.01)
*B65G 39/06* (2006.01)

(52) U.S. Cl.
CPC ........... *B65G 49/064* (2013.01); *B65G 39/06* (2013.01); *B65G 49/06* (2013.01); *B65G 2201/022* (2013.01)

(58) Field of Classification Search
CPC ........ B65G 13/00; B65G 39/06; B65G 39/07; B65G 49/06; B65G 2201/022; B08B 11/04; B08B 3/022
(Continued)

(56) References Cited

U.S. PATENT DOCUMENTS

2014/0116836 A1    5/2014    Wang et al.
2019/0241377 A1    8/2019    Zhang et al.

FOREIGN PATENT DOCUMENTS

CN    201567077 U    9/2010
CN    201961834 U    9/2011
(Continued)

OTHER PUBLICATIONS

International Search Report and Written Opinion issued in International Application No. PCT/CN2018/078668, dated Jun. 21, 2018, with English translation.

*Primary Examiner* — Gene O Crawford
*Assistant Examiner* — Lester Rushin, III

(57) ABSTRACT

A rolling member includes a rolling shaft; rolling wheels fixed to two ends of the rolling shaft, rolling surfaces of the rolling wheels being sleeved with flexible loops respectively; at least one first engagement structure provided on a rolling surface of each rolling wheel; at least one second engagement structure provided on a surface of each flexible loop facing toward the rolling surface of the rolling wheel;
(Continued)

wherein the at least one first engagement structure engages with the at least one second engagement structure.

9 Claims, 6 Drawing Sheets

(58) Field of Classification Search
USPC .................................................... 193/37, 35
See application file for complete search history.

(56)              References Cited

FOREIGN PATENT DOCUMENTS

| CN | 202163902   | * | 3/2012  |
|----|-------------|---|---------|
| CN | 202163902 U |   | 3/2012  |
| CN | 202346358 U |   | 7/2012  |
| CN | 206599264 U |   | 10/2017 |

\* cited by examiner

ROLLING ELEMENT AND TRANSPORT APPARATUS

CROSS-REFERENCE TO RELATED APPLICATIONS

This application is a national phase entry under 35 USC 371 of International Patent Application No. PCT/CN2018/078668 filed on Mar. 12, 2018, which claims priority to Chinese Patent Application No. 201720309995.9, filed with the Chinese Patent Office on Mar. 27, 2017, titled "A ROLLING ELEMENT AND TRANSPORT APPARATUS", which are incorporated herein by reference in their entirety.

TECHNICAL FIELD

The present disclosure relates to the field of manufacturing a display panel, and in particular, to a rolling element and a transport apparatus.

BACKGROUND

When display panels are manufactured, it is generally necessary to clean glass substrates of the display panels firstly. At present, the glass substrates are usually transported by a transport apparatus with double rolling wheels. And front and back surfaces of the glass substrate are cleaned by utilizing high-pressure water to achieve the purpose of cleaning during the transporting process.

SUMMARY

In an aspect, embodiments of the present disclosure provide a rolling element, and the rolling element includes a rolling shaft, rolling wheels, at least one first engaging structure and at least one second engaging structure. The rolling wheels are fixed at two ends of the rolling shaft. And rolling surfaces of the rolling wheels are sleeved with flexible loops respectively.

At least one first engaging structure is disposed on a rolling surface of each rolling wheel, and at least one second engaging structure is disposed on a surface of each flexible loops loop facing toward the rolling surface of the rolling wheel. The at least one first engaging structure is engaged with the at least one second engaging structures structure.

Optionally, the rolling element further includes a plurality of first annular grooves are arranged in a surface of the rolling shaft in an axial direction of the rolling shaft, each first annular groove is disposed along a circumference direction of the rolling shaft;

a sectional plane of the first annular groove along an axial sectional plane of the rolling shaft is trapezoidal or V-shaped;

an area of a bottom surface of the first annular groove is less than an area of an opening of the first annular groove when the sectional plane of the first annular groove along the axial sectional plane of the rolling shaft is trapezoidal.

Optionally, the at least one first engaging structure is at least one protrusion, and the at least one second engaging structure is at least one groove;

or, the at least one first engaging structure is at least one groove, and the at least one second engaging structure is at least one protrusion.

Optionally, the at least one protrusion includes a plurality of protrusions, and the plurality of protrusions are arranged along a circumference direction of a corresponding rolling wheel;

the at least one grooves includes a plurality of grooves, and the plurality of grooves are arranged along a circumference direction of a corresponding flexible loop;

the plurality of protrusions are engaged with the plurality of grooves in one-to-one correspondence.

Optionally, each protrusion is cylindrical.

Optionally, each protrusion is cylindrical, a side surface of the protrusion is disposed with bosses each of which circles around the side surface.

Optionally, an area of an opening of each groove is less than an area of a bottom surface of the groove in a case where the at least one second engaging structure is the at least one groove Optionally, each first engaging structure is a second annular groove in a circumference direction of a corresponding rolling wheel, each second engaging structure is an annular protrusion in a circumference direction of a corresponding flexible loop.

Optionally, an angle between a side wall and a bottom surface of each first annular groove is 120° when the sectional plane of the first annular groove along the axial sectional plane of the rolling shaft is trapezoidal.

In another aspect, embodiments of the present disclosure provide a transport apparatus, the transport apparatus includes any one rolling element described above. The transport apparatus includes two rolling elements, and the two rolling elements are disposed oppositely. A gap in which a substrate to be transported is disposed is between flexible loops of the two rolling elements. The transport apparatus further includes a driving motor configured to drives rolling shafts of the two rolling elements to be rotated in reverse directions.

BRIEF DESCRIPTION OF THE DRAWINGS

In order to describe technical solutions in embodiments of the present disclosure more clearly, the accompanying drawings to be used in the description of embodiments will be introduced briefly. Obviously, the accompanying drawings to be described below are merely some embodiments of the present disclosure, and a person of ordinary skill in the art can obtain other drawings according to these drawings without paying any creative effort.

DETAILED DESCRIPTION

The technical solutions in embodiments of the present disclosure will be described clearly and completely with reference to the accompanying drawings in embodiments of the present disclosure. Obviously, the described embodiments are merely some but not all of embodiments of the present disclosure. All other embodiments made on the basis of the embodiments of the present disclosure by a person of ordinary skill in the art without paying any creative effort shall be included in the protection scope of the present disclosure.

Figure 1:
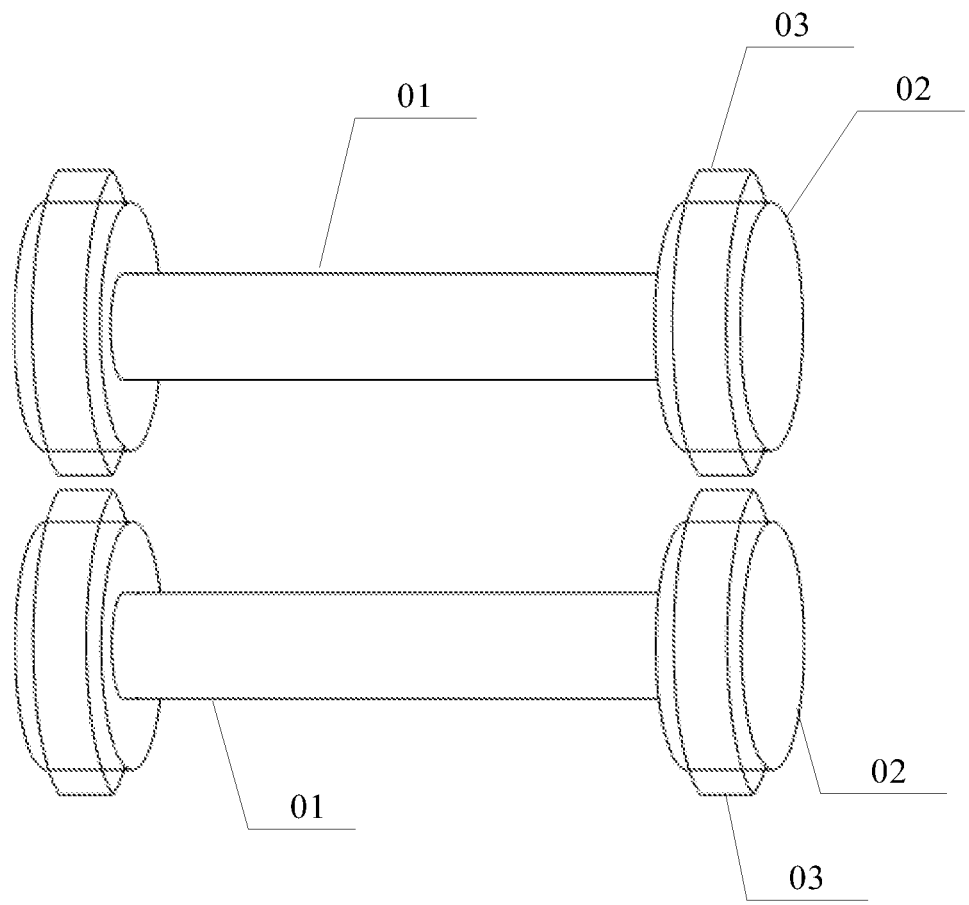
FIG. 1 is a schematic diagram showing a structure of an exemplary transport apparatus with double rolling wheels provided by embodiments of the present disclosure.
Figure 2:
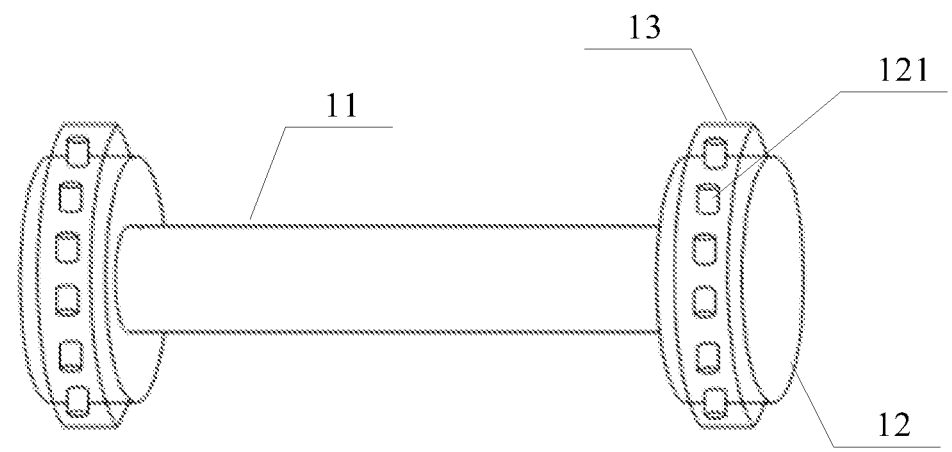
FIG. 2 is a first schematic diagram showing a structure of a rolling element provided by embodiments of the present disclosure.

A structure of a transport apparatus with double rolling wheels is generally as shown in FIG. 1, and the transport apparatus includes an upper rolling element and a lower rolling element which are oppositely disposed. Both of the upper rolling element and the lower rolling element include a rolling shaft 01 and rolling wheels 02 fixed at both ends of the rolling shaft 01. Rolling surfaces of the rolling wheels 02 are each sleeved with a flexible loop 03, and edges of a glass substrate are sandwiched between flexible loops 03 of both the upper rolling element and the lower rolling element. A driving motor drives rolling shafts 01 of both the lower rolling element and the upper rolling element to rotate in reverse directions, thereby driving the glass substrate to go forward.

However, during a working process of the transport apparatus with double rolling wheels, the flexible loops 03 are often misaligned with the rolling wheels 02, especially when the impact force of the high pressure water on the rolling shafts 01 is too large and therefore the rolling shafts 01 may shake up and down greatly, the possibility that the flexible loops 03 occur misalignments increases sharply. The misalignments of the flexible loops 03 directly cause the edges of the glass substrate to be broken or the glass substrate to be poorly transported.

Embodiments of the present disclosure provide a rolling element 10, and as shown in FIGS. 2-14, the rolling element includes a rolling shaft 11 and rolling wheels 12 fixed at two ends of the rolling shaft 11. Flexible loops 13 are sleeved on rolling surfaces of the rolling wheels 12 respectively. First engaging structure(s) 121 are disposed on a rolling surface of a rolling wheel 12, and second engaging structure(s) 131 are disposed on a surface of a flexible loop 13 opposite to the rolling surface of the rolling wheel 12. The first engaging structure 121 and the second engaging structure 121 are engaged.

The first engaging structure 121 and the second engaging structure 131 may be various structures. Exemplarily, the first engaging structure 121 and the second engaging structure 131 may be a protrusion and a groove respectively, or be a hook and a groove respectively. The embodiments of the present disclosure do not limit this, as long as the first engaging structure 121 and the second engaging structure 131 may be engaged.

In this way, compared with the embodiments shown in FIG. 1, in the embodiments shown in FIGS. 2-14, by respectively disposing the first engaging structure and the second engaging structure on opposite surfaces of the rolling wheel and the flexible loop, the first engaging structure is engaged with the second engaging structure to achieve a stable connection between the rolling wheel and the flexible loop, thereby reducing the possibility of the misalignment between the rolling wheel and the flexible loop.

Figure 3:
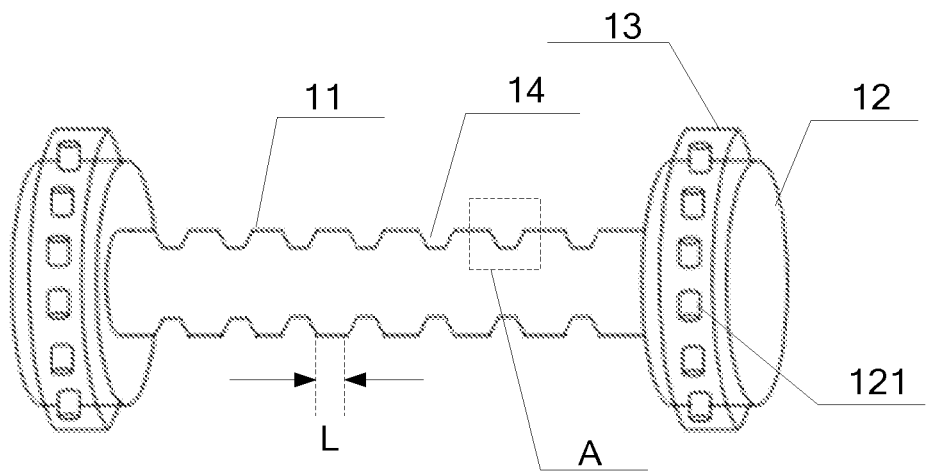
FIG. 3 is a second schematic diagram showing a structure of a rolling element provided by embodiments of the present disclosure.
Figure 4:
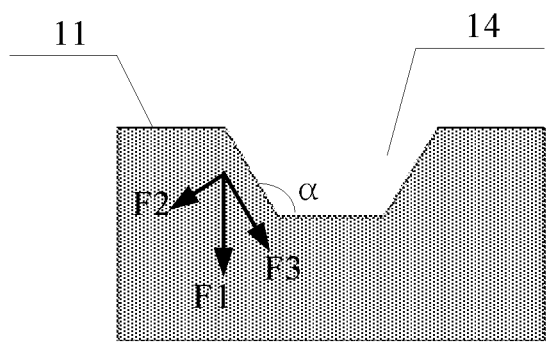
FIG. 4 is a first enlarged diagram of area A in FIG. 3.
Figure 5:
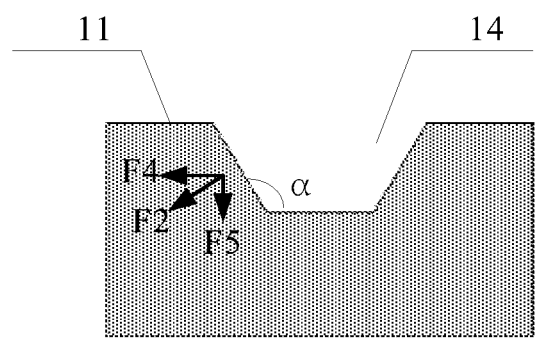
FIG. 5 is a second enlarged diagram of area A in FIG. 3.
Figure 6:
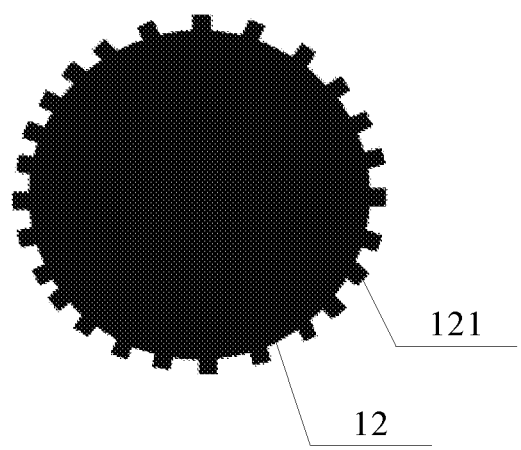
FIG. 6 is a first schematic diagram showing a structure of a rolling wheel provided by embodiments of the present disclosure.
Figure 7:
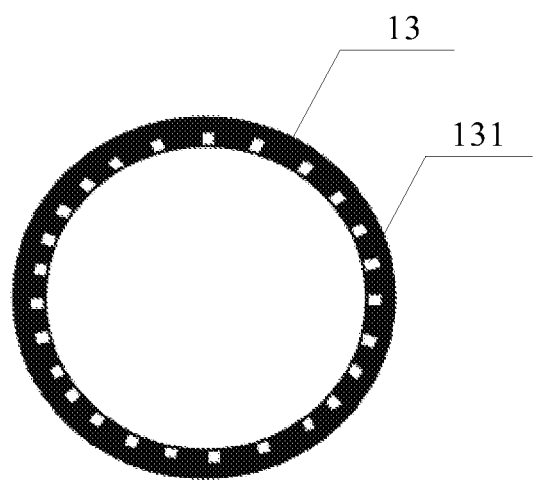
FIG. 7 is a first schematic diagram showing a structure of a flexible loop provided by embodiments of the present disclosure.

Further, referring to FIGS. 3-5, a plurality of first annular grooves 14 are arranged in the rolling shaft 11 in an axial direction of the rolling shaft 11. Each first annular groove 14 is disposed along a circumference of the rolling shaft 11. A sectional plane of the first annular groove 14 along an axial section plane of the rolling shaft 11 is trapezoidal or V-shaped. An area of a bottom surface of the first annular groove 14 is less than an area of an opening of the first annular groove 14 when the sectional plane of the first annular groove 14 along the axial section plane of the rolling shaft 11 is trapezoidal.

The embodiments of the present disclosure do not limit an angle between two side walls of the first annular groove 14 when the sectional plane of the first annular groove 14 along the axial section plane of the rolling shaft 11 is V-shaped. When the sectional plane of the first annular groove 14 along the axial section plane of the rolling shaft 11 is trapezoidal, the embodiments of the present disclosure do not limit an angle between a side wall and a bottom surface of the first annular groove 14, which may be set by those skilled in the art according to the actual situation.

In actual applications, in convenience for manufacturing, the angle $\alpha$ between the side wall and the bottom surface of the first annular groove 14 is 120° when the sectional plane of the first annular groove 14 along the axial section plane of the rolling shaft 11 is trapezoidal. FIGS. 4-5 are force analysis diagrams when the side wall of the first annular groove 14 is subjected to the impact force of high pressure water from top to bottom. Referring to FIGS. 4-5, when the high pressure water contacts the side wall of the first annular groove 14, a downward impact force F1 is decomposed into a force F2 that is vertical to the side wall and a force F3 that is obliquely downward and parallel to the side wall. The force F3 that is obliquely downward and parallel to the side wall does not affect the shake of the rolling shaft 11. FIG. 5 is an decomposition chart of the force F2 that is vertical to the side wall. The force F2 is decomposed into a horizontal force F4 and a vertical force F5, and only the vertical force F5 causes the rolling shaft 11 to be shaken, and the horizontal force F4 does not cause the rolling shaft 11 to be shaken. Since the force F5 is smaller compared to the impact force F1, the shake of the rolling shaft 11 caused by the impact force F1 is effectively reduced. The angle $\alpha$ between the side wall and the bottom surface of the first annular groove 14 is set to 120°, F2 is equal to a procut of 0.5 and F1, and F5 is equal to a product of 0.5 and F2, and equal to a product of 0.25 and F1. It may be seen that the side wall of the first annular groove 14 which is inclined decomposes effectively the impact force of the high pressure water on the rolling shaft 11 in an up and down direction, thereby significantly reducing the shake of the rolling shaft 11 caused by the impact of high pressure water, and further increasing stability of the connection of the rolling wheel 12 to the flexible loop 13.

The specific number of the first annular grooves 14 is not limited by the embodiments of the present disclosure. In actual applications, a distance between each two adjacent first annular grooves 14 is 1 cm. As such, the side wall of the first annular groove 14, which is inclined, is used to decompose the impact force of the high pressure water on the rolling shaft 11 in the up and down direction, thereby significantly reducing the shake of the rolling shaft 11, and further reducing the possibility of the misalignment between the rolling wheel 12 and the flexible loop 13.

Referring to FIGS. 6-12, the first engaging structure 121 is a protrusion, and the second engaging structure 131 is a groove. Alternatively, the first engaging structure 121 is a groove, and the second engaging structure 131 is a protrusion.

The embodiments of the present disclosure do not limit the shapes, sizes, arrangement numbers, distributions, and the like of the protrusions and the grooves, which may be set by those skilled in the art according to actual conditions. For manufactural convenience, in actual applications, the protrusion is generally designed to be cylindrical. In order to make the engagement securer, boss(es) 15 may also be disposed on the side surface of the protrusion and circles surround the side surface of the protrusion.

Optionally, referring to FIGS. 6-7 and 9-10, a plurality of protrusions are provided, and the plurality of protrusions are arranged along a circumferential direction of the rolling wheel 12. A plurality of grooves are provided, and the plurality of grooves are arranged along a circumference direction of the flexible loop 13. The plurality of protrusions are engaged with the plurality of grooves in one-to-one correspondence. This makes the engagement between the rolling wheel 12 and the flexible loop 13 more stable.

Figure 12:
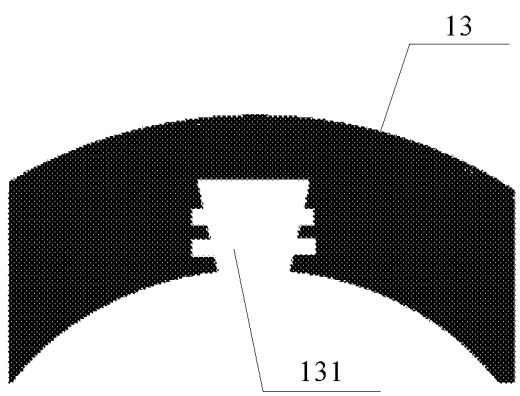
FIG. 12 is a third schematic diagram showing a structure of a flexible loop provided by embodiments of the present disclosure.

Further, referring to FIG. 12, when the second engaging structures 131 are grooves, an area of an opening of each groove is less than an area of a bottom surface of the groove. Since the flexible loop 13 has a certain degree of elasticity, the opening of the groove of the flexible loop 13 is elastically deformed and thus the size of the flexible loop 13 becomes larger by applying a force to the opening of the groove, thereby allowing the protrusion fitted with the groove to be entered and realizing the engagement. Such an interference fit may make the engagement between the groove and the protrusion more stable, that is, the rolling wheel 12 and the flexible loop 13 are more firmly engaged.

Figure 8:
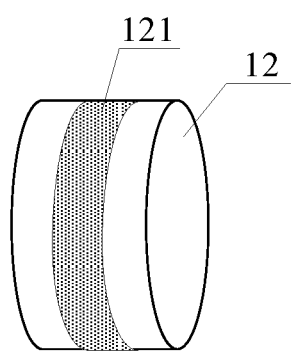
FIG. 8 is a second schematic diagram showing a structure of a rolling wheel provided by embodiments of the present disclosure.
Figure 9:
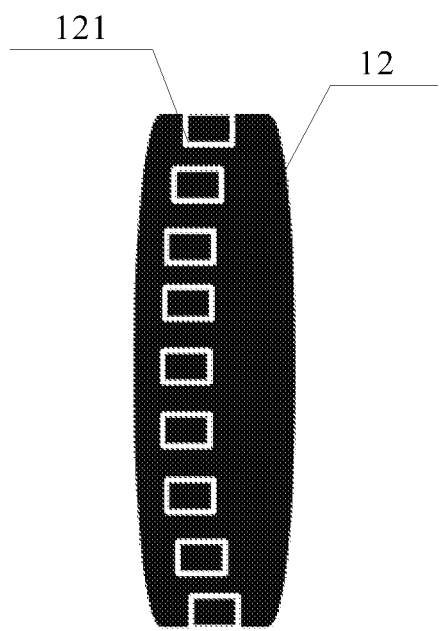
FIG. 9 is a third schematic diagram showing a structure of a rolling wheel provided by embodiments of the present disclosure.
Figure 10:
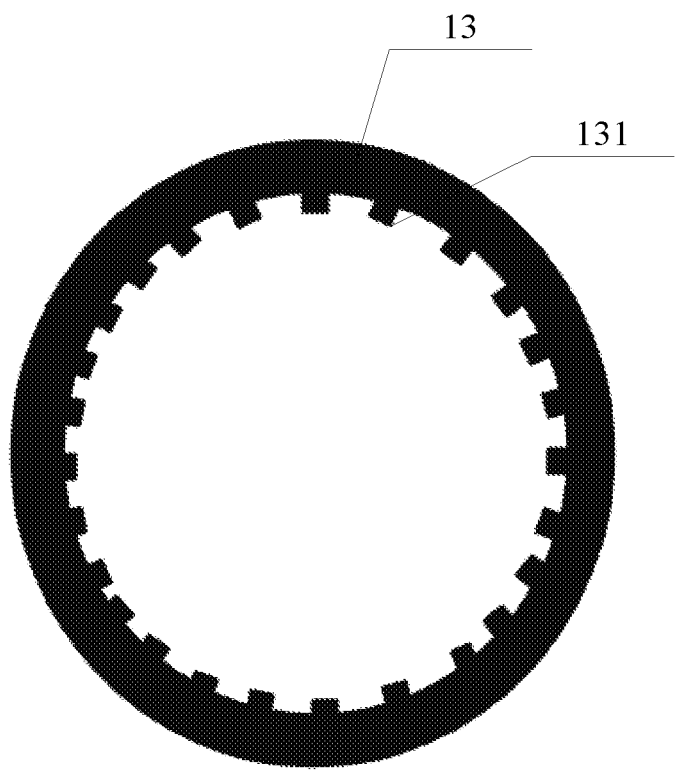
FIG. 10 is a second schematic diagram showing a structure of a flexible loop provided by embodiments of the present disclosure.
Figure 11:
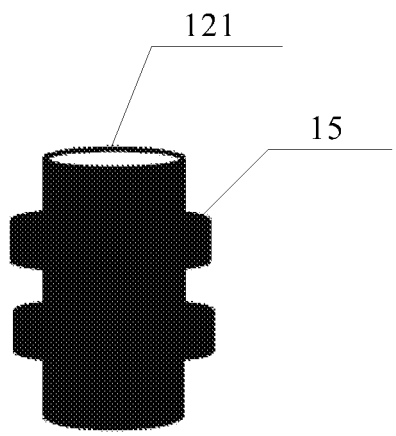
FIG. 11 is a fourth schematic diagram showing a structure of a rolling wheel provided by embodiments of the present disclosure.

Optionally, referring to FIG. 8, the first engaging structure 121 is a second annular groove in the rolling wheel 12 along the circumferential direction of the rolling wheel 12, and the second engaging structure 131 is an annular protrusion disposed the flexible loop 13 along the circumferential direction of the flexible loop 13. Such a engaging structure is simply manufactured and has a good effect of engagement.

The rolling element provided in FIGS. 2-14 includes the rolling shaft and rolling wheels fixed at two ends of the rolling shaft. Flexible loops are sleeved on rolling surfaces of the rolling wheels respectively. The first engaging structure is disposed on the rolling surface of the rolling wheel, and the second engaging structure is disposed on the surface of the flexible loop opposite to the rolling surface of the rolling wheel. The first engaging structure and the second engaging structure 121 are engaged. Compared with the embodiments shown in FIG. 1, in the embodiments shown in FIGS. 2-14, by respectively disposing the first engaging structure and the second engaging structure on opposite surfaces of the rolling wheel and the flexible loop, the first engaging structure is engaged with the second engaging structure to achieve the stable connection between the rolling wheel and the flexible loop, thereby reducing the possibility of the misalignment between the rolling wheel and the flexible loop.

Figure 13:
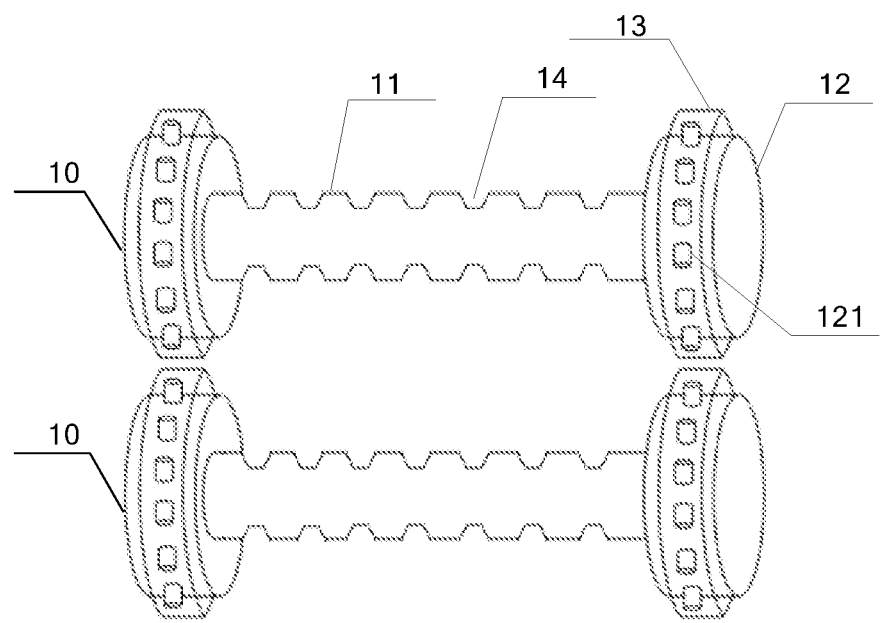
FIG. 13 is a first schematic diagram showing a structure of a transport apparatus provided by embodiments of the present disclosure.
Figure 14:
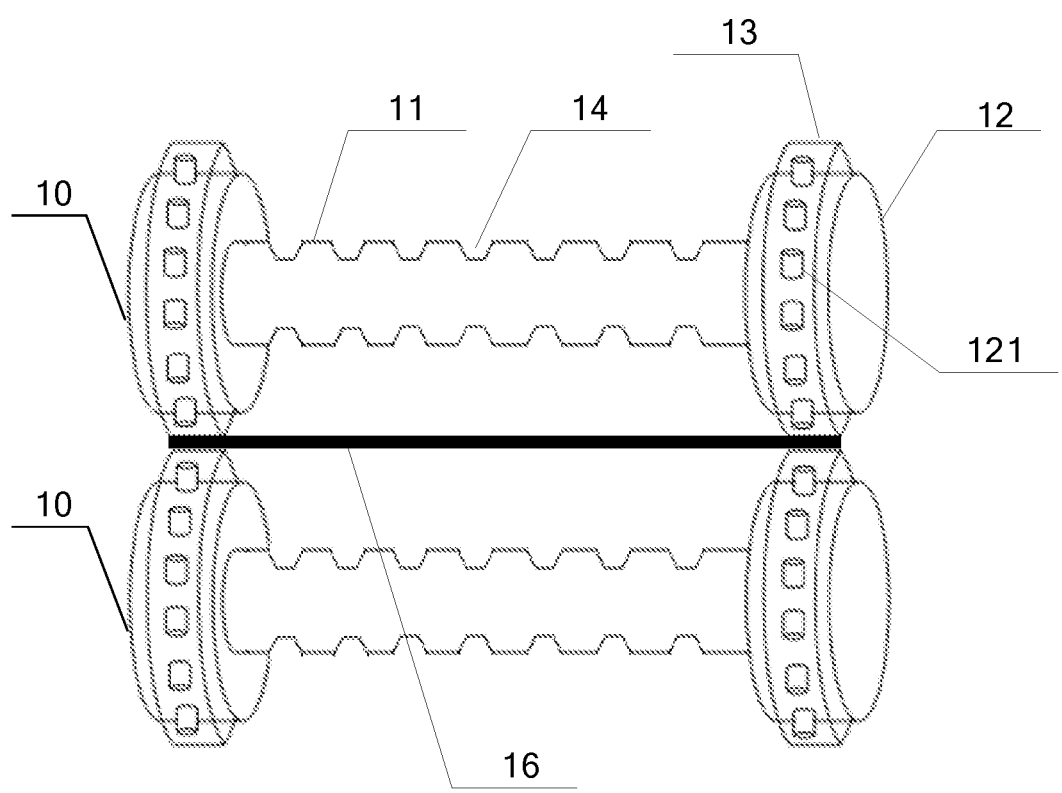
FIG. 14 is a second schematic diagram showing a structure of a transport apparatus provided by some embodiments of the present disclosure.

Another embodiment of the present disclosure provides a transport apparatus. Referring to FIGS. 13-14, the transport apparatus includes any one kind of the above-described rolling elements 10. Two rolling elements 10 are provided, and the two rolling elements 10 are oppositely disposed. A gap, in which a substrate 16 to be transported is disposed, is between flexible loops 13 of the two rolling elements 10. The above transport apparatus further includes a driving motor. The driving motor may drive rolling shafts 11 of the two rolling elements 10 to rotate in reverse directions. Thus, compared with the embodiments shown in FIG. 1, in the embodiments shown in FIGS. 2-14, by respectively disposing the first engaging structure 121 and the second engaging structure 131 on opposite surfaces of the rolling wheel 12 and the flexible loop 13, the first engaging structure 121 is engaged with the second engaging structure 131 to achieve the stable connection between the rolling wheel 12 and the flexible loop 13, thereby reducing the possibility of the misalignment between the rolling wheel 12 and the flexible loop 13, as well as reducing the damage to edges of the glass substrate resulted from misalignments of the flexible loops 13 or reducing the poor transportation of the glass substrate.

The foregoing descriptions are merely some specific implementation manners of the present disclosure, but the protection scope of the present disclosure is not limited thereto. Any person skilled in the art could readily conceive of changes or replacements within the technical scope of the present disclosure, which shall all be included in the protection scope of the present disclosure. Therefore, the protection scope of the present disclosure shall be subject to the protection scope of the claims.

What is claimed is:

1. A rolling element, comprising:
   a rolling shaft;
   a plurality of first annular grooves arranged in a surface of the rolling shaft in an axial direction of the rolling shaft, wherein each first annular groove is disposed along a circumference direction of the rolling shaft;
   rolling wheels fixed at two ends of the rolling shaft, rolling surfaces of the rolling wheels being sleeved with flexible loops respectively;
   at least one first engaging structure disposed on a rolling surface of each rolling wheel; and
   at least one second engaging structure disposed on a surface of each flexible loop facing toward the rolling surface of the rolling wheel, wherein the at least one first engaging structure is engaged with the at least one second engaging structure, wherein
   a sectional plane of the first annular groove along an axial sectional plane of the rolling shaft is trapezoidal or V-shaped; and
   an area of a bottom surface of the first annular groove is less than an area of an opening of the first annular groove when the sectional plane of the first annular groove along the axial sectional plane of the rolling shaft is trapezoidal.

2. The rolling element according to claim 1, wherein the at least one first engaging structure is at least one protrusion, and the at least one second engaging structure is at least one groove;
   or, the at least one first engaging structure is at least one groove, and the at least one second engaging structure is at least one protrusion.

3. The rolling element according to claim 2, wherein the at least one protrusion includes a plurality of protrusions, and the plurality of protrusions are arranged along a circumference direction of a corresponding rolling wheel;

the at least one groove includes a plurality of grooves, and the plurality of grooves are arranged along a circumference direction of a corresponding flexible loop;

the plurality of protrusions are engaged with the plurality of grooves in one-to-one correspondence.

4. The rolling element according to claim 2, wherein each protrusion is cylindrical.

5. The rolling element according to claim 2, wherein each protrusion is cylindrical, a side surface of the protrusion is provided with bosses each of which circles around the side surface.

6. The rolling element according to claim 2, an area of an opening of each groove is less than an area of a bottom surface of the groove in a case where the at least one second engaging structure is the at least one groove.

7. The rolling element according to claim 1, wherein each first engaging structure is a second annular groove in a circumference direction of a corresponding rolling wheel, each second engaging structure is an annular protrusion in a circumference direction of a corresponding flexible loop.

8. The rolling element according to claim 1, wherein an angle between a side wall and a bottom surface of each first annular groove is 120° when the sectional plane of the first annular groove along the axial sectional plane of the rolling shaft is trapezoidal.

9. A transport apparatus, comprising:
two rolling elements according to claim 1, wherein the two rolling elements are disposed oppositely, a gap in which a substrate to be transported is disposed is between flexible loops of the two rolling elements; and
a driving motor configured to drive rolling shafts of the two rolling elements to be rotated in reverse directions.

* * * * *

UNITED STATES PATENT AND TRADEMARK OFFICE
CERTIFICATE OF CORRECTION

PATENT NO. : 10,723,567 B2
APPLICATION NO. : 16/343372
DATED : July 28, 2020
INVENTOR(S) : Wanpeng Zhang et al.

It is certified that error appears in the above-identified patent and that said Letters Patent is hereby corrected as shown below:

On the Title Page

In item "(86) PCT No." please change "PCT/CN2018/007866" to --PCT/CN2018/078668--.

In the Specification

Column 1, Line 42, delete "loops.".

Column 1, Line 44, delete "structures.".

Column 1, Line 46, delete "are.".

Column 2, Line 14, after "groove" insert --.--.

Signed and Sealed this
Seventeenth Day of November, 2020

Andrei Iancu
*Director of the United States Patent and Trademark Office*